(12) United States Patent
Wichlund

(10) Patent No.: US 11,804,947 B2
(45) Date of Patent: Oct. 31, 2023

(54) RADIO RECEIVER SYNCHRONIZATION

(71) Applicant: Nordic Semiconductor ASA, Trondheim (NO)

(72) Inventor: Sverre Wichlund, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 17/736,007

(22) Filed: May 3, 2022

(65) Prior Publication Data
US 2022/0376886 A1 Nov. 24, 2022

(30) Foreign Application Priority Data
May 6, 2021 (GB) .................................. 2106476.1

(51) Int. Cl.
*H04L 7/04* (2006.01)
*H04L 7/00* (2006.01)
*H04W 56/00* (2009.01)

(52) U.S. Cl.
CPC ............ *H04L 7/042* (2013.01); *H04L 7/0087* (2013.01); *H04W 56/001* (2013.01)

(58) Field of Classification Search
CPC .... H04L 7/042; H04L 7/0087; H04W 56/001; H04B 1/707
(Continued)

(56) References Cited

U.S. PATENT DOCUMENTS

| 2004/0170237 A1 | 9/2004 | Chadha et al. |
| 2007/0104297 A1* | 5/2007 | Gorday ............... H04B 1/707 375/150 |

(Continued)

FOREIGN PATENT DOCUMENTS

| EP | 1 414 208 A1 | 4/2004 |
| WO | WO 2014/167318 A2 | 10/2014 |

(Continued)

OTHER PUBLICATIONS

IPO Combined Search and Examination Report under Sections 17 and 18(3) for GB2106478.7, dated Sep. 22, 2021, 7 pages.
(Continued)

*Primary Examiner* — Phuong Phu
(74) *Attorney, Agent, or Firm* — Klarquist Sparkman, LLP

(57) ABSTRACT

A radio apparatus correlates signal data with stored synchronization data to determine correlation data. The signal data represents a received radio-frequency signal that encodes a data frame, which has a synchronization preamble with a plurality of instances of a predetermined synchronization sequence. The stored synchronization data represents the predetermined synchronization sequence. The radio apparatus identifies a set of peaks in the correlation data, and uses a timing criterion to identify a plurality of subsets of the set of peaks, such that time values of the peaks of each identified subset satisfy the timing criterion. The radio apparatus calculates a correlation score $C_j$ for each of the identified subsets from correlation values of the subset's peaks, and uses the correlation scores $C_j$ to select a subset from the plurality of subsets. Timing or frequency synchronization information for the radio apparatus is determined from the peaks of the selected subset.

22 Claims, 13 Drawing Sheets

(58) Field of Classification Search
USPC .................................. 375/362, 364–368, 343
See application file for complete search history.

(56) References Cited

U.S. PATENT DOCUMENTS

| | | |
|---|---|---|
| 2008/0075212 A1 | 3/2008 | Chun et al. |
| 2018/0212749 A1 | 7/2018 | Au Yeung et al. |
| 2019/0109698 A1 | 4/2019 | Laugeois |
| 2019/0238309 A1 | 8/2019 | Fort |

FOREIGN PATENT DOCUMENTS

| | | |
|---|---|---|
| WO | WO 2015/189584 A1 | 12/2015 |
| WO | WO 2017/103557 A1 | 6/2017 |
| WO | WO 2018/104708 A1 | 6/2018 |

OTHER PUBLICATIONS

IPO Search Report under Section 17 for GB2106476.1, dated Sep. 22, 2021, 4 pages.
U.S. Appl. No. 17/737,672, dated May 5, 2022, Li.
Extended European Search Report for European Application No. 22171913.1, dated Nov. 23, 2022, 8 pages.

\* cited by examiner

RADIO RECEIVER SYNCHRONIZATION

CROSS REFERENCE TO RELATED APPLICATION

This application claims priority from Great Britain Application No. 2106476.1, filed May 6, 2021, which application is incorporated herein by reference in its entirety.

FIELD

This invention relates to the synchronization of radio receivers.

BACKGROUND

For a radio receiver to be able to decode incoming radio data packets reliably, accurate timing synchronization is required, both at the symbol level (i.e. to identify the timing of the symbols within a data packet) and at the frame/packet level (i.e. to identify the start of the packet). Better synchronization will generally lead to greater receiver sensitivity.

A non-coherent radio receiver can determine timing-synchronization information by performing correlation operations on incoming signals. Many radio protocols define fixed packet preamble sequences that enable efficient frame and symbol synchronization by causing the radio transmitter to transmit a known modulated waveform at the start of each packet. The radio receiver can detect this waveform and use its arrival to determine frame and symbol timing information. In some protocols, the preamble sequence contains a repeated pattern. This can allow for more efficient implementation of a correlator in the radio receiver, as the correlator need only correlate on a shorter, single unit of the repeated pattern.

However, reliably obtaining fast and accurate synchronization can be challenging, especially over noisy channels. Additionally, any discrepancy between a transmission frequency used by the transmitter device and a reference frequency used by the receiver device when downmixing the incoming radio signals can also make accurate synchronization harder. Such frequency offsets may arise due to manufacturing tolerances and/or varying environmental conditions. A radio receiver may determine frequency-synchronization information, such as a frequency-offset estimate, by comparing frequency or phase information obtained from an incoming radio signal with a signal from a local oscillator, and can use this information to correct for any frequency offset.

WO 2017/103557 and WO 2018/104708, by the present applicant, described synchronization procedures that can be used when receiving a synchronization preamble containing a repeated sync-word sequence. When correlating against such a sync word, a successful synchronization event is declared once a set of above-threshold correlation peaks, spaced apart in time by amounts corresponding to the length of the sync word plus or minus a noise error margin, A, reaches a threshold count. Symbol timing synchronization information (strobe timing) is then determined from the set of peaks, for performing symbol timing recovery, and a carrier-frequency offset estimate is also determined, for applying carrier frequency offset compensation.

However, such an approach has been found to result in undesirable synchronization performance under some conditions. Embodiments of the present invention therefore seek to provide an improved approach to synchronizing a radio receiver.

SUMMARY

From a first aspect, the invention provides a radio apparatus configured to:
  correlate signal data with stored synchronization data to determine correlation data, wherein the signal data represents a received radio-frequency signal that encodes a data frame having a synchronization preamble comprising a plurality of instances of a predetermined synchronization sequence, and wherein the stored synchronization data represents the predetermined synchronization sequence;
  identify a set of peaks in the correlation data, each peak having an associated correlation value and an associated time value;
  use a timing criterion to identify a plurality of subsets of the set of peaks, such that the time values of the peaks of each identified subset satisfy the timing criterion;
  calculate a respective correlation score for each of the identified subsets from the correlation values of the peaks of the respective subset;
  use the correlation scores to select a subset from the plurality of subsets; and
  determine timing- or frequency-synchronization information for the radio apparatus from the peaks of the selected subset.

From a second aspect, the invention provides a method of synchronizing a radio apparatus, the method comprising:
  correlating signal data with stored synchronization data to determine correlation data, wherein the signal data represents a received radio-frequency signal that encodes a data frame having a synchronization preamble comprising a plurality of instances of a predetermined synchronization sequence, and wherein the stored synchronization data represents the predetermined synchronization sequence;
  identifying a set of peaks in the correlation data, each peak having an associated correlation value and an associated time value;
  using a timing criterion to identify a plurality of subsets of the set of peaks, such that the time values of the peaks of each identified subset satisfy the timing criterion;
  calculating a respective correlation score for each of the identified subsets from the correlation values of the peaks of the respective subset;
  using the correlation scores to select a subset from the plurality of subsets; and
  determining timing- or frequency-synchronization information for the radio apparatus from the peaks of the selected subset.

Thus it will be seen that, in accordance with embodiments of the invention, synchronization information is determined by finding subsets of peaks, from within a set of correlation peaks arising from a repetitive synchronization preamble, that have valid timing patterns between the peaks (i.e. corresponding to the expected positions of peaks), and then synchronizing the radio based on the peaks of a "best" one of the subsets.

This can be contrasted with naïve approaches, such as those described in WO 2017/103557 and WO 2018/104708, which do not involve searching for subsets within a larger set of peaks, but which simply declare synchronization as done as soon as a valid-spaced set of peaks, of the required quantity, is detected, and then determine timing- and frequency-synchronization information once, based on every peak in this set. As explained in more detail below, if the correlation data contains spurious peaks which nevertheless conform to an expected timing pattern, such naïve approaches can result in slower synchronization, or less accurate synchronization, or even a failure to synchronize at all, resulting in packet errors or losses.

By identifying more peaks than may strictly be required for determining synchronization information, and then finding a highest-scoring subset of the peaks, embodiments of the present invention can lead to better receiver sensitivity, with a lower risk of inaccurate or failed synchronization, even when the correlation data contains spurious peaks.

Embodiments may receive the radio-frequency (RF) signal, which may be a radio signal or an electrical representation of a radio signal. The radio apparatus may comprise a radio receiver for receiving the RF signal as a radio signal. The radio apparatus may be configured to generate the signal data from the received RF signal, e.g. using an analog-to-digital converter to generate a time series of complex sample values. The synchronization information may be determined while the radio apparatus is receiving the RF signal—i.e. in real-time. It may, in some embodiments, be determined before the radio apparatus has finished receiving the synchronization preamble of the RF signal.

The apparatus may determine synchronization information repeatedly—i.e. two or more times. It may determine first synchronization information at a first time using a first portion of the correlation data, and then determine second synchronization information at a second time, after the first time, using a second portion of the correlation data. The second portion may include some or all of the first portion and may include additional correlation data determined after the first portion was determined. In this way, embodiments may be able to provide the first synchronization information promptly, and then provide updated (e.g. improved) synchronization information as more of the preamble is received. The apparatus may be configured to perform the steps of identifying a set of peaks, identifying a plurality of subsets, calculating correlation scores, selecting a subset, and determining synchronization information, a plurality of times on different (potentially overlapping) respective portions of the correlation data determined from the signal data.

The apparatus may generate the correlation data over time, e.g. as a time series of correlation samples. It may detect peaks within the correlation data as the correlation data is generated. It may determine updated synchronization information in response to detecting a new peak in the correlation data. In some embodiments it may determine updated synchronization information every time a new peak is detected, for at least a plurality of peaks in the correlation data—e.g. for every new peak detected after a minimum number of peaks has been detected.

It may determine synchronization information by identifying a set of peaks from correlation data spanning the complete synchronization preamble (i.e. covering the whole preamble). When determining synchronization information repeatedly, this may be last synchronization information determination that is made for this data frame. By making use of the full synchronization preamble, the apparatus can potentially synchronize more accurately than if it were to terminate the process before the full correlation data had been considered.

Such approaches may be particularly beneficial when the synchronization sequence is repeated several times within the preamble—e.g. four, eight, ten or more times. Radio protocols such as IEEE 802.15.4 and Bluetooth Low Energy define such repetitive synchronization preambles. In some preferred embodiments, the RF signal is a IEEE 802.15.4 or Bluetooth Low Energy signal and the radio apparatus is configured to decode IEEE 802.15.4 (e.g. Zigbee or Thread) or Bluetooth Low Energy signals.

The synchronization data may be stored in a memory of the apparatus. The stored synchronization data may comprise a series of sample values representing a baseband waveform. The stored synchronization data may correspond to a single instance of the predetermined synchronization sequence, or to a plurality of such instances. The synchronization sequence (and optionally other data) in the data frame may be encoded using a direct-sequence spread spectrum. The data frame may be modulated on the RF signal using phase-modulation, frequency-modulation, amplitude-modulation, or a combination of such modulations. It may be offset quadrature phase-shift keying (O-QPSK) modulated. In some embodiments, e.g. that use a "double" correlation operation, the synchronization data may comprise a series of values, where each value equals a first sample representative of the synchronization sequence multiplied by the complex conjugate of a second sample representative of the synchronization sequence, wherein each second sample is offset from each first sample by a fixed offset (e.g. three sample periods).

The radio apparatus may comprise a hardware correlator (i.e. comprising electrical circuitry) for correlating the signal data with the stored synchronization data. The correlation data may comprise a time series of correlation values. The correlation values may comprise phase information, e.g. being complex correlation values. The correlation data may be sampled at regular sample intervals, and thus comprise inherent timing information. The correlator may, in some embodiments, be configured to correlate the stored synchronization data with a first sample of the signal data multiplied by the complex conjugate of a second sample representative of the synchronization sequence, wherein each second sample is offset from each first sample by a fixed offset (e.g. three sample periods)—referred to herein as a "double" correlation.

The set of peaks may be identified by performing a peak-detection process on the correlation data. This may comprise determining correlation values in the correlation data that meet a threshold criterion—e.g. correlation values having an absolute value that is greater than a threshold. The threshold may be constant or it may be dynamic. It may change over a duration of the synchronization preamble of the data frame. In some embodiments, the threshold depends on the correlation values and/or time values of one or more already-identified peaks—e.g. equalling the product of a constant term (e.g. 1.5) and the mean of the correlation amplitudes of a plurality preceding peaks (e.g. of the latest two peaks) received within the preceding fixed-duration time period (e.g. within the last 64 µs). This may help to prevent data after the synchronization preamble, such as a start-of-frame delimiter symbol, from being identified as a peak.

Data (e.g. an array) representing the identified set of peaks may be stored in a memory of the apparatus—e.g. in a set of hardware registers or in RAM. Each peak may be represented by a complex correlation value and a time value. The set (or pool) of peaks may be bounded by a maximum number (e.g. twelve peaks). The apparatus may be configured to apply a purge process to remove one or more peaks from the set before adding a new peak when the set is full. It may determine a peak to purge based on the time values of the peaks (e.g. purging the oldest peak, or purging the peak having a lowest score under a temporal-spacing metric), or based on the correlation values of the peaks (e.g.

purging the peak having the lowest absolute correlation value). The temporal-spacing metric may determine, for a given peak, how many other peaks in the set are separated from the peak in time by times that correspond to the duration of the predetermined synchronization sequence— e.g. that are separated by an integer multiple of said duration, plus or minus a jitter allowance.

The apparatus may be configured to sort of the set of peaks according to a sort policy. It may sort (i.e. rank) the peaks based on the time values of the peaks (e.g. sorting from newest to oldest, or sorting from highest to lowest score under the temporal-spacing metric), or based on the correlation values of the peaks (e.g. sorting from highest to lowest absolute correlation value). Sorting may physically rearrange the data in memory, or it may comprising altering an indexing of the stored data.

The timing criterion for identifying a subset of peaks may be satisfied when the time values of the peaks of a subset are separated from each other by integer multiples of the duration of the predetermined synchronization sequence, within a predetermined margin for jitter (e.g. +/−1%). In this way, only peaks that are likely to arise due to the preamble sequence are identified. The apparatus may be configured to apply the timing criterion to a group of peaks by calculating a set of time intervals between the highest-ranked peak of the group, under the sort policy, and each of the other peaks in the group, and determining whether each time interval is an integer multiple of said duration plus or minus a predetermined margin.

In some embodiments, identifying the subsets of peaks may additionally use a quantity criterion, which may be satisfied only when a subset contains at least a minimum number of peaks, e.g. at least three peaks.

Identifying the plurality of subsets may comprise performing a search process. It may be a greedy search process. It may comprise determining, for each of a plurality of peaks in the set, whether a subset of peaks exists for which the respective peak is the highest-ranked peak (e.g. the newest peak) in the subset, under the sort policy, and wherein the subset satisfies the timing criterion. It may determine this serially in time, e.g. by stepping through the peaks of the set in rank order, starting from the highest-ranked peak (e.g. the newest peak). Alternatively, it may determine this in parallel. It may determine this for every peak of the set, optionally except for a predetermined number of the lowest-ranked peaks.

The correlation score for each subset may be calculated using a coherent averaging process. It may be calculated as the magnitude of the sum of the correlation values of the peaks in the subset. A subset may be selected from the plurality of subsets by comparing the correlation scores. The subset having the highest correlation score may be selected.

Timing-synchronization information may be determined from the time values of the peaks in the selected subset. The timing-synchronization information may comprise symbol-synchronization information.

Frequency-synchronization information may be determined from phases of the correlation values of the peaks in the selected subset. The frequency-synchronization information may comprise a frequency-offset estimate.

The radio apparatus may be configured to use the determined timing- or frequency-synchronization information when decoding the data frame—e.g. when decoding message data. It may use the synchronization information when performing frame synchronization.

The radio apparatus may be an integrated radio apparatus—e.g., a silicon chip. (It will be appreciated that the radio apparatus may nevertheless require one or more off-chip components to be connected to the radio apparatus for it to operate, such as a power supply, antenna, crystal, discrete capacitors, discrete resistors etc.) The radio apparatus may comprise a radio transmitter.

The radio apparatus may comprise one or more processors, DSPs, logic gates, amplifiers, filters, digital components, analogues components, non-volatile memories (e.g., for storing software instructions), volatile memories, memory bus systems, peripherals, inputs, outputs, or any other appropriate electronic components. The radio apparatus may comprise circuitry for performing timing-, phase- or frequency-correction operations.

Some or all of the steps may be implemented in software, or in hardware, or in a combination of software and hardware.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
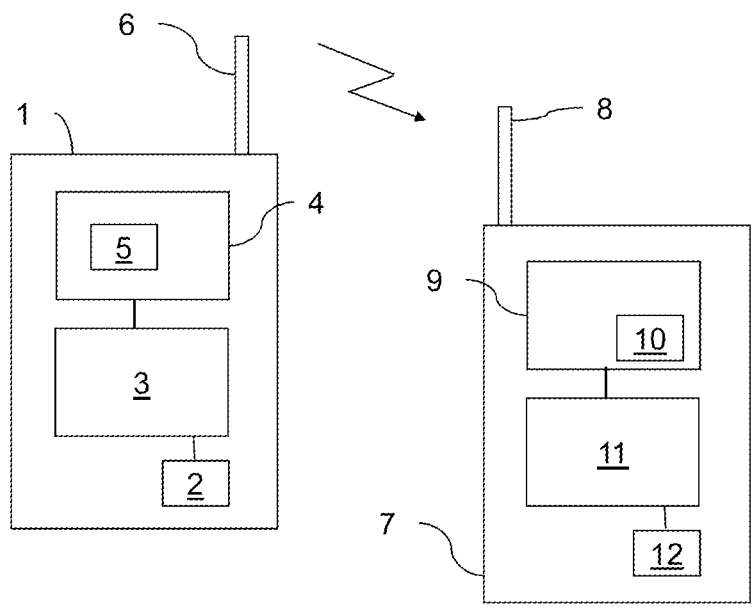
FIG. 1 is a schematic drawing of a radio communication system including a receiver embodying the invention.

FIG. 1 shows, by way of an example embodiment, a radio communication system comprising a wireless thermostat 1 which is in short-range radio communication with a wireless-network hub 7. The hub 7 is a radio receiver embodying the present invention.

The wireless thermostat 1 has a temperature sensor 2 which is connected to a microprocessor 3 (such as an ARM™ Cortex M-series). The microprocessor 3 is connected to a radio transmitter 4. The radio transmitter 4 includes an encoder 5 (among other components). The encoder 5 may be implemented by a dedicated hardware circuit, or by software executing on a processor, or by a combination of hardware and software logic. Other conventional components, such as memory, a battery, etc. are also present, but are omitted from FIG. 1 for the sake of simplicity. The microprocessor 3 and radio transmitter 4 may be integrated on a single silicon chip. The monitor 1 has a radio antenna 6, which may be integrated on such a chip or external to it.

The hub 7 has, among other conventional components (not shown), an antenna 8 which is connected to a radio receiver 9. The antenna 8 is suitable for receiving short-range radio communications from wireless-personal-area-network devices, including the wireless thermostat 1. The radio receiver 9 includes synchronization and decoding logic 10, among other components. The logic 10 may be implemented by a dedicated hardware circuit, or by software executing on a processor, or by a combination of hardware and software logic. The radio receiver 9 is connected to a microprocessor 11 (such as an ARM™ Cortex M-series), which can output data for display on a screen 12, possibly via other components, such as a further microprocessor (not shown) running an operating system and appropriate software applications.

In use, the wireless thermostat 1 receives periodic temperature readings from the temperature sensor 2. The microprocessor 3 processes the readings into a suitable format for transmission, and sends the message data to the radio transmitter 4. The radio transmitter 4 determines whether the message data can fit within a single data packet (corresponding to a single data frame), or if it must be split across two or more data packets. The encoder 5 in the radio transmitter 4 encodes part or all of the message data, e.g. using a convolution-based forward-error-correcting code, and adds any headers or other metadata to the encoded message data to create a packet payload. It then direct-sequence-spread-spectrum (DSSS)-encodes this entire payload using a fixed chip sequence. For example, each four-bit symbol might be represented by a different respective 32-bit spreading sequence. Of course, other lengths of chip sequence may be used. The transmitter 4 then prepends a synchronization word to the payload, consisting of a number repetitions of a predetermined sequence. This may be followed by a predetermined start-of-frame delimiter (SFD) and/or a payload-length header, before the data payload containing the message data. The radio transmitter 4 transmits the encoded data packet from the antenna 6, modulated on a radio-frequency carrier (e.g. a carrier in the 2.4 GHz band), using a suitable modulation scheme.

In some embodiments, the wireless thermostat 1 and hub 7 communicate using a protocol having a physical layer that implements a version of the IEEE 802.15.4 standard. They may, for example, communicate using Thread™ or Zigbee™. In some such embodiments, each 4-bit symbol is mapped onto a 32-chip spreading sequence, and packets are modulated using offset quadrature phase-shift keying (O-QPSK) operating at a data rate of 250 kb/s. Each symbol thus has a duration of 16 μs.

Figure 2:
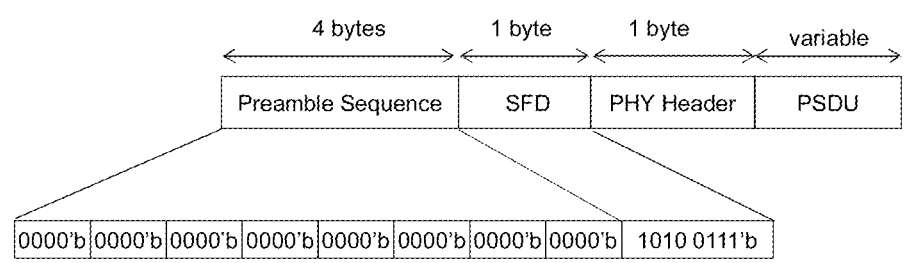
FIG. 2 is a diagram of a data packet that may be transmitted and received by the radio communication system.

FIG. 2 shows an exemplary data packet structure used in such 802.15.4 embodiments. It has a 32-bit (8-symbol) preamble sequence, followed by an 8-bit start-of-frame delimiter (SFD), an 8-bit physical-layer (PHY) header, and a variable-length PHY service data unit (PSDU) of between zero and 127 octets. The preamble sequence consists of eight instances of the zero symbol, 0000'b. After DSSS-encoding this becomes eight instances of the same 32-chip sequence. The SFD field contains the fixed two symbols 1010 0111'b (0xA7) and introduces the start of the substantive content of the frame, which starts with a variable in the PHY header that indicates the length of the PSDU and then provides the PSDU itself.

In use, the wireless-network hub 7 receives the radio data packet at the antenna 8. The radio receiver 9 down-mixes the received signal to an intermediate frequency or directly to baseband, and then samples the signal to generate a stream of complex digital samples values, representing in-phase and quadrature components of the received signal. The signal may first be filtered in the analog and/or digital domains. The receiver 9 processes the modulated digital signal using the synchronization and decoding logic 10.

The synchronization and decoding logic 10 performs non-coherent decoding. It first cross-correlates the incoming sample stream, I & Q, with stored data representing the waveform, at baseband, of a single instance of the modulated chip sequence corresponding to the synchronization symbol, 0000'b. It does this by maintaining a buffer of the most recently-generated samples, and calculating a time series of complex inner-product operations between the stored synchronization template and the currently-buffered data, thereby generating a time series of complex correlation values, $C_n$. It analyses the correlation values over time in order to perform symbol timing recovery and frequency offset correction. This process is explained in more detail below, with reference to FIG. 3.

The repetitive synchronization sequence allows the synchronization and decoding logic 10 to detect and synchronize to a packet based on the separation in time between correlator matches, as well as correlator output amplitude as described in more detail below.

The synchronization and decoding logic 10 additionally correlates against the SFD waveform to detect the end of the preamble and the start of the PSDU, thereby achieving frame (i.e. packet) synchronization. The radio receiver 9 can then decode the PSDU, using the acquired frame and symbol timing information to do so, before passing the decoded message data to the microprocessor 11 for processing.

The microprocessor 11 may process the message data in any appropriate way. In some embodiments, it may display temperature information graphically on a display screen 12 of the hub 7 for a user to see.

In some embodiments, the wireless thermostat 1 and hub 7 may be configured so that temperature message data is transferred from the wireless thermostat 1 to the hub 7 using the Thread™ or Zigbee™ specification. The wireless thermostat 1 and hub 7 may be equipped for two-way radio communication, using corresponding components as those described above for performing radio transmission in the opposite direction. However, this is not essential in all embodiments.

Figure 3:
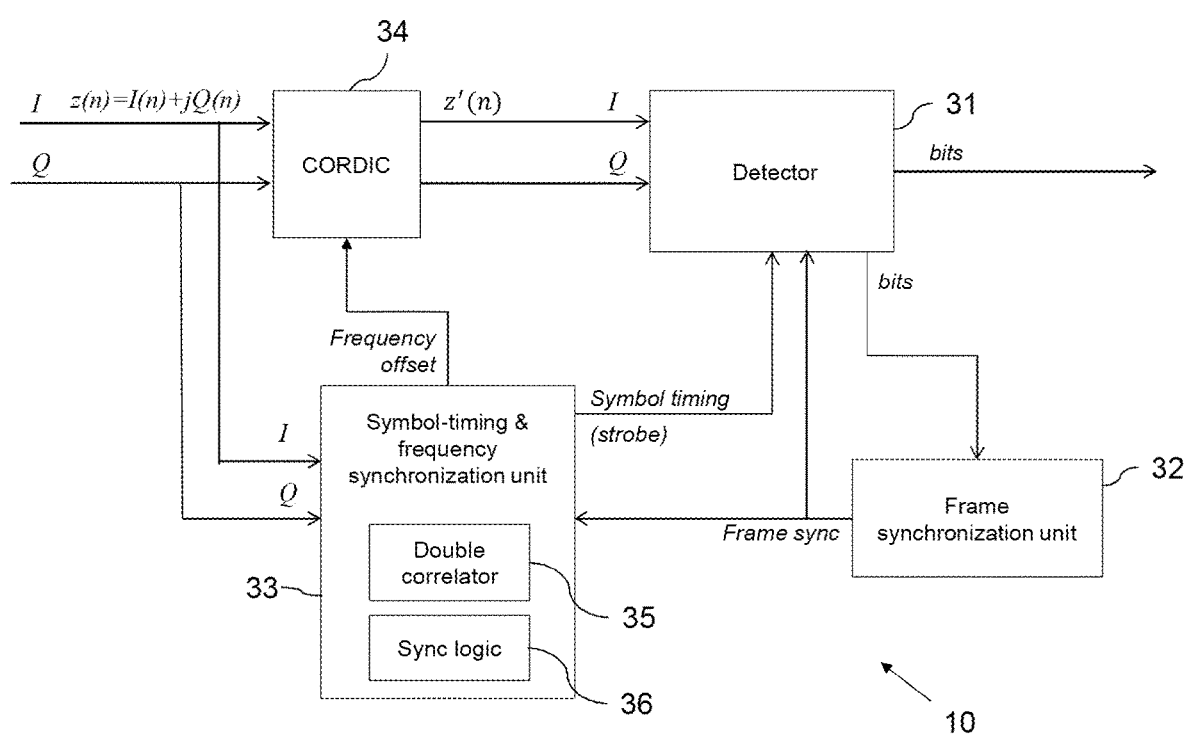
FIG. 3 is schematic drawing of synchronization and decoding logic of the radio receiver.

FIG. 3 schematically represents various digital baseband processing units implemented by the synchronization and decoding logic 10 for detecting and decoding a received data frame. Operations such as filtering and residual frequency-offset tracking are not shown, for reasons of conciseness.

Complex-valued baseband samples, I & Q, are received into a data-aided joint timing and frequency synchronization unit 33, for determining timing synchronization data and frequency-offset estimation data. The synchronization unit 33 is coupled to a CORDIC (coordinate rotation digital computer) unit 34, for performing carrier frequency offset (CFO) compensation on the incoming samples. The CFO-compensated complex samples then pass to a detector 31, which despreads and detects the DSSS-encoded data symbols. The detector 31 outputs a decoded data stream to the microprocessor 11. A frame-synchronization unit 32 receives data from the detector 31 into an SFD correlator, and outputs frame synchronization information to the detector 31 and synchronization unit 33.

FIG. 3 uses the following notation:
n=chip index;
z(n)=complex baseband samples;
z'(n)=carrier-frequency offset (CFO) compensated z(n);
h(n)=hard decision bits from despread data;
SFD=stored data representing the start-of-frame delimiter;
pdata$_i$(k)=stored data representing the i different 32-bit DSSS chip sequences.

The timing- and frequency-synchronization unit 33 comprises a correlator 35, referred to herein as a "double" correlator 35, for performing data-aided joint timing and frequency estimation, and associated synchronization logic 36. This exploits knowledge of the data in the received symbols to cancel the effect of the modulation on the estimate of a delay-and-correlate type of carrier frequency offset estimator.

Because a repetitive synchronization word is received, additional checks on the time domain distances between successive magnitude responses can be used to filter out false detections. This means that a shorter correlator with a lower detection threshold can be used to achieve a given level of sensitivity lowering receiver complexity.

The synchronization unit 33 in FIG. 3 correlates against the repeated synchronization word in order to calculate the following cross correlation values for every incoming baseband sample, $z_n = I(n) + jQ(n)$:

$$C_n = \sum_{i=0}^{L-1} [z_{n-i} z^*_{n-i-D}] d_i,$$

where the coefficients $d_i$ comprise stored synchronization data, calculated in advance,
in which $d_i = p_i^* p_{i+D}$ where pi are samples corresponding to the predetermined synchronization symbol at baseband,
where D is a lag which is decided at design time (e.g. sixteen samples), and
where L is the length of the synchronization symbol.

The signal may, in some embodiments, be over-sampled and/or up-sampled, in which case the stored synchronization data may be scaled up correspondingly. The cross-correlation operation may be performed using sample-wise multiplication operations.

The synchronization unit 33 is also able to generate carrier-frequency offset estimates according to the equation:

$$\Delta \hat{f} = \frac{1}{2\pi DT} \arg \left\{ \sum_{i=0}^{L-1} [z_{n-i} z^*_{n-i-D}] d_i \right\},$$

where T is the sample period.

Assuming that the carrier frequency offset is relatively constant over D samples, this estimate provides a good estimate of the carrier-frequency offset, so long as it is sampled when the correlation is aligned with an incoming synchronization symbol—i.e. at time instants corresponding to peaks in the correlation value |Cn|, or in a normalised metric such as M given by:

$$M_n = \frac{|C_n|}{P_n}, \text{ where } P_n = \sum_{i=0}^{L-1} |z_{n-i-D}|^2.$$

Qualifying peaks in the correlation data may be determined against a magnitude threshold, as explained below. They are stored in a peak pool 60 and processed as described below, to determine what peaks to use for generating carrier frequency offset (CFO) estimates for the CORDIC unit 34 and symbol timing information (strobe times) for synchronizing the detector 31.

The CORDIC unit 34 receives frequency offset estimates from the synchronization unit 33, and uses the latest frequency offset estimate it receives to rotate subsequent incoming samples by a corresponding phase angle, to compensate for any carrier frequency offset. The resulting CFO-compensated sequence of complex baseband samples z'(n) is then passed to the detector 31. This outputs data bits (which may be hard or soft) to the frame synchronization unit 32.

The SFD correlator in the frame synchronization unit 32 performs a correlation operation $F = \Sigma_{k=1}^{N} h(n-k) SFD(k)$ using a stored version of the start-of-frame delimiter, in order to determine frame synchronization for the incoming data frame.

The logic 10 may be implemented in hardware and may include a finite state machine (FSM) for orchestrating the synchronization and decoding process.

Figure 4:
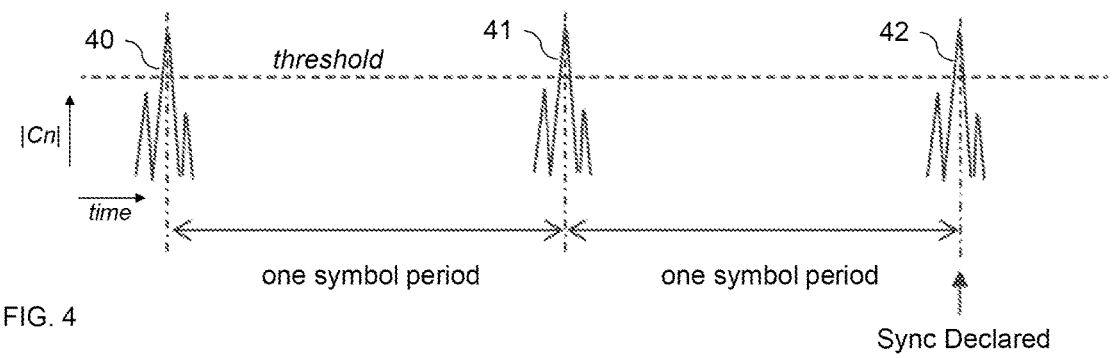
FIG. 4 is schematic graph of correlation amplitude against time in a first example scenario.
Figure 5:
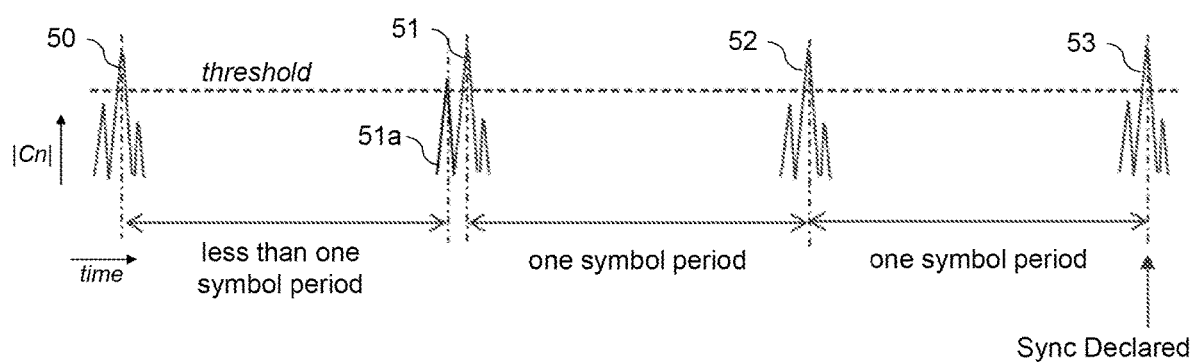
FIG. 5 is schematic graph of correlation amplitude against time in a second example scenario.

FIGS. 4 & 5 illustrate some of the challenges which can arise when using a naïve approach to synchronization, and which are addressed by embodiments as disclosed herein. They show peaks in the correlation amplitude, over time, generated by correlating incoming signals against a predetermined preamble sequence, having the form shown in FIG. 2.

A naïve approach might identify peaks above a threshold level (represented by the horizontal dashed lines in FIGS. 4 & 5) using any appropriate peak-finding algorithm, and may declare that symbol-timing synchronization has been achieved as soon as three peaks have been identified that satisfy a spacing requirement that each successive peak occurs after the preceding peak by one preamble-symbol period plus/minus a tolerance for jitter (e.g. +/−5%).

When the output is as shown in FIG. 4, in which a first peak 40, second peak 41 and third peak 42 occur exactly at the preamble-symbol spacing, this approach may work adequately.

However, the output as shown in FIG. 5 would cause synchronization problems. In this example, a second peak 51 has a sidelobe peak 51a that is above the threshold, but that occurs less than 0.95 of a symbol period after a preceding peak 50, causing both the first peak 50 and the sidelobe peak 51a to be discarded, even though the first peak 50 was a valid peak. This then delays synchronization being declared by one symbol duration, until the second peak 51, a third peak 52 and a fourth peak 53 have been identified. Delayed synchronization is undesirable in itself, but if this situation occurs several times within one packet preamble, then synchronization may fail altogether for that packet. A spurious peak could be a sidelobe of a valid peak, or any other erroneous above-threshold peak such as a peak arising due to noise.

Conversely, if three spurious peaks occur that satisfy the spacing condition, the receiver could falsely declare synchronization based on the timing of these spurious peaks, which will then not be correct and could lead to loss of the packet.

In general, if synchronization loss can be reduced, the sensitivity of a radio receiver should improve. Ideally, this would be done without unduly reducing selectivity (that is, the receiver's ability to reject signals on channels outside the desired tuned channel).

Embodiments disclosed herein therefore take a different approach. They do not simply discard information about already-received peaks whenever a latest-received peak fails to satisfy a spacing criterion. Instead, at any moment, they can identify all the valid preamble peaks, from a mix of valid and spurious peaks, that have been received over a preceding time window.

As well as improving synchronization performance, as explained below, this approach can also enable better frequency-offset estimates to be calculated, by allowing estimates to be calculated based on phase values determined over more than just the three peaks identified by the naïve approach described above.

The present synchronization and decoding logic 10 (specifically the synchronization unit 33) therefore runs unconditionally all the way up to the detection of the SFD, rather than terminating as soon as synchronization can be declared. Above-threshold peaks are identified and stored in a pool, which is periodically searched (i.e. screened) for valid peaks. This novel approach can lead to improved selectivity.

The logic 10 is configured to exclude, from the pool of peaks used for determining symbol timing, any above-threshold correlation peaks stemming from the SFD symbols. It may do so by detecting different time-offsets of such peaks, relative to peaks from the preamble symbols and/or by applying a dynamic threshold for detecting peaks—e.g. requiring each new peak, received within four symbol periods (64 μs) of a preceding peak, to have a correlation amplitude, |Cn|, that is at least 50% higher than the mean of the correlation amplitudes of the preceding two peaks.

An exemplary algorithm, implemented by the synchronization and decoding logic 10 in some embodiments, will now be described in more detail, by reference to the drawings and to representative pseudo code. This is, however, just one example algorithm, and the principles disclosed herein may be implemented in different ways in other embodiments.

Figure 6:
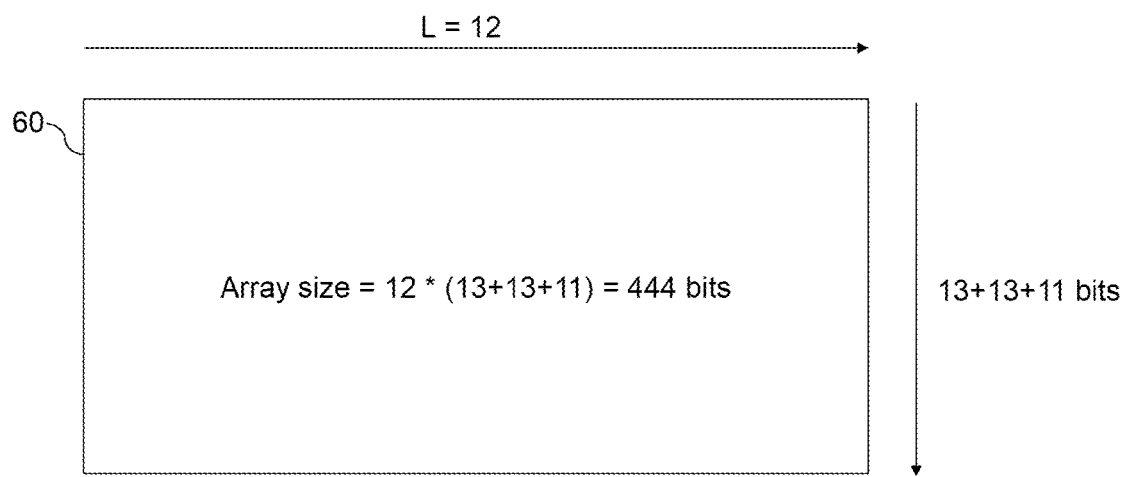
FIG. 6 is schematic diagram of a memory structure used by synchronization logic of a radio receiver embodying the invention.

FIG. 6 schematically shows a data structure for storing a pool 60 of identified peaks. This is an array having L columns, where each column contains the complex correlation value and a timestamp for a respective peak. In this example, the pool can store data for L=12 peaks, each peak being represented by a complex correlation value, stored as a 13-bit real part and a 13-bit imaginary part, and an 11-bit timestamp. If the synchronization logic 10 is implemented in hardware, the data structure may be stored in a dedicated set of registers or flip-flops. If it is implemented in software on a processor, the pool may be stored in RAM.

During operation, the synchronization algorithm looks at the distance, in number of samples, between the set of peaks stored in the pool 60. The maximum time span that needs to be considered by the algorithm is the length of the preamble plus some headroom allowing for buffer and detector latency. If a sample rate of 8 MHz is used, an 11-bit timestamp can represent up to 256 μs which should therefore be sufficient for detecting an 8×16 μs=128 μs long preamble.

The synchronization and decoding logic 10 (specifically the synchronization logic 36, in the present embodiment) applies a peak detection process to the output of the correlator 35, contained within the synchronization unit 33, as samples are received in real-time. It identifies every peak above a sample-magnitude threshold (which may be a constant or dynamic threshold). The timestamp for a peak is determined as the time of the sample of largest magnitude, after a threshold is crossed, before the sample magnitudes start to fall. Each newly-identified peak is added to the pool 60. If the pool 60 is full, a peak is removed from the pool 60, e.g. based on age and/or ranking (i.e. correlation magnitude).

Each time a new peak is added, the logic 10 then searches the whole pool 60 to identify a subset of peaks satisfying a search criterion. The search criterion takes account of the spacing between the peaks, as explained below. The size of the qualifying subsets must be between configurable minimum and maximum parameters, minNumPeaks and maxNumPeaks. If multiple qualifying subsets are found, the search process returns the subset that has the largest accumulated correlation value, Cn.

Each time the search identifies a subset, the synchronization and decoding logic 10 estimates symbol timing from the timestamps of the peaks in the subset. It also estimates a frequency offset from the vector of accumulated correlation values (Cn) for the peaks in the subset. Considering all possible subsets will typically be inefficient and may well be infeasible in a practical implementation. Instead, the logic 10 constructs subsets in a greedy fashion, controlled by a user-configurable parameter sortpolicy. In particular, peaks are ranked and each successive sweep operation within the search process is terminated once a required number of qualifying peaks has been identified, so as to strike a balance between efficiency and finding an optimal solution.

The pseudocode below illustrates a function findBestSubset( ) for searching the pool 60 for a "best" subset.

The subset construction contains two for-loops: an outer loop starts by initializing a candidate subset with the highest-ranking peak (controlled by a sortpolicy parameter), while an inner loop searches over the rest of the peaks in decreasing rank order, adding a peak to the subset if it has a valid distance to the peak currently selected by the outer loop, until a maximum number of peaks has been added. The outer loop then moves on to the next-highest-ranking peak (according to sortpolicy), and the inner loop runs again to search over the lower-ranked peaks, and so on. The subset with the largest magnitude of accumulated Cn values is returned.

If the peak pool 60 ever gets full, some peak has to go. When a configurable parameter purgepolicy=0, the oldest peak is overwritten when full. When purgepolicy>0, a ranking of the peaks is performed, and the lowest ranking peak is thrown out.

The following table summarises the configuration parameters used by the algorithm. These may be fixed during production (e.g. stored in a write-once memory of the radio receiver 9) or they may be controlled by firmware executing on the device 7, e.g. in response to particular operating conditions. The table shows example allowed values in one set of embodiments.

| Name | Description | Values |
|---|---|---|
| Threshold | The threshold correlation magnitude ("Mn") for detecting a peak | 0.36, . . . , 0.40 |
| L | The peak pool size in number of peaks | [8, 12] |
| minNumPeaks | The minimum required number of peaks required to sync on (i.e. for forming a vector that will be used for estimating symbol timing and frequency offset) | 2, 3 |
| maxNumPeaks | The maximum number of peaks to sync on | 5 |
| JTOL (jitter tolerance) | The maximum allowed "jitter" in number of samples between peaks | 1, 2 |
| gamma | A hyperparameter, whereby a smaller value favours including more peaks in the vector | [0.0, 0.5] |
| purgepolicy | 0: purge oldest peak from pool when full<br>1: purge the peak with smallest \|Cn\| when full<br>2: purge the least relevant peak, being the peak with the fewest valid spacings to other peaks | 0, 1, 2 |
| purgeagelim | Only in effect if purgepolicy > 0. If the oldest peak has survived for a number of purges ≥ purgeagelim then unconditionally purge it; if not, follow the purge policy | [1, 2] |
| sortpolicy | 0: peaks are visited in the order newest to oldest<br>1: peaks are visited in the order of decreasing \|Cn\|<br>2: peaks are visited in the order of decreasing "relevance", where the relevance of a peak is the number of other peaks that are separated from the peak by valid distances | 0 |

Implementation and/or performance complexity are minimised when purgepolicy=0, sortpolicy=0, and gamma=0.0.

In particular, when sortpolicy=0 there is no sorting, and the search algorithm simply selects the newest peak and tries to find a subset of validly-spaced peaks by working backwards in time through the pool 60. It then selects the second-newest peak and does the same, and so on, over all the peaks the pool 60.

The following pseudocode contains embedded explanatory comments. It uses the parameters defined in the table above. Further explanation is provided in the paragraphs following the pseudocode.

```
P={empty}
while(not FrameSync)
{
  if (peak'Mn > Threshold) then {
    P=P+{peak} // store peak'time, peak'Mn, peak'Cn
    if(|P|>1) then {
      // compute relevance rank vector
      // Only needed if sortpolicy=2 or purgepolicy=2
      relvec=compPeakRelevance(P)
      S=findBestSubset(P,minNumPeaks,maxNumPeaks,gamma,relvec,sortpolicy)
      if(S not empty) then {
        compute and apply symbol timing and freq. offset estimate based on S
      }
      // pool housekeeping
      if(|P|>=L) then {
        // the pool is full so we have to make space for another peak
        if(purgepolicy<1) {
          purge oldest peak from P // just overwrite the oldest peak
        } else {
          if(survivals(oldest peak)>purgeagelim) {
            // we have kept the oldest peak in the pool long enough
            // we must purge the oldest peak now
            purge oldest peak from P
          } else {
            survivals(oldest peak)++
            if(purgepolicy==1) {
              purge the peak having the smallest |Cn| from the pool
            } else {
              purge the peak having the least connections (index=min(relvec))
            }
          }
        }
      }
    } else {
      reset counters etc to "mid range"
      if(minNumPeaks==1) {
        compute & apply symbol timing & freq. offset est. based on this peak
      }
    }
  }
}
```

-continued

```
fun findBestSubset(P,k,gamma,relvec,sortpolicy) {
// Find the subset S of max size k, |P|>=k>=minNumPeaks, in P that satisfies:
// a. the peaks are spaced at integer multiples of symbol period +/- jitter,
// b. |sum(peaks'Cn in S)|/(|S|^gamma) is maximum
// Note that the number of subsets grows exponentially in |P|
// so we have to prune the set of subsets
// rank the peaks according to given policy selection,
// then try to grow S starting with the highest ranking peak (greedy)
   P'=sort(P) // where "sort" sorts the pooled peaks by the sortpolicy
   maxlen=0
   Sbest={ }
   ul=min(k, |P'|) // the upper set size limit
   for sidx=1 to |P*[prime;|-ul+1    // *THE OUTER LOOP*
   {
      S={P'(sidx)}
      n=1
      for i=1 to ul-1 // *THE INNER LOOP*
      {
         idx=sidx+i
         if P'(idx) has proper distance, n*128-16+/-JTOL, from P'(sidx) then {
            S=S ∪ {P'(idx)}
            n++
            if(n>=minNumPeaks) then {
               cvec=sum(peaks'Cn in S)
               val=abs(cvec)/(|S|^gamma)
               if(val>maxlen) then {
                  maxlen=val
                  Sbest=S // store the best subset found so far
                  likelySFDsync=0;
               }
            }
         }
      }
      // Check if startpeak is likely the first SFD symbol
      // Only execute if startpeak for outer loop is the latest-received peak
      // AND nothing was found above (n==1)
      if( (sortpolicy==0) AND (n==1) AND (sidx==1) ) {
         for i=1 to ul-1
         {
            idx=sidx+i
            if P'(idx) has proper distance, n*128-16+/-JTOL, from P'(sidx) then {
               S = S ∪ {P'(idx)}
               n++
               if(n>=minNumPeaks) then {
                  cvec=sum(peaks'Cn in S)
                  val=abs(cvec)/(|S|^gamma)
                  if(val>maxlen) then {
                     maxlen=val
                     Sbest=S // store the best subset found so far
                  }
               }
            }
         }
         if (|Sbest|>reqnumzerosymbefSFD) {
            likelySFDsync=1; // this may be cleared if a better vector is found
            likelySFDseen=1;
         }
      }
   }
   if(|Sbest|>= minNumPeaks)
      return(Sbest) // going to subsequent symbol timing and freq. offset est.
   else
      return (emptyset)
}
fun compPeakRelevance(P)
// Compute a relevance vector for the current set of peaks
// Each peak is assigned the number of other peaks within valid distance
{
   N=|P|
   relvec=all zeros
   for k=1 to N-1
   {
      for l=k+1 to N // count each "edge" only once
      {
         if(P(k) has proper distance from P{l))
         // i.e. deltadist=n*16us +/- jitter, n=1,..., 7
         {
            relvec{k}++
            relvec{l}++
```

```
      }
    }
  }
  return(relvec)
}
```

The subset search algorithm within findBestSubset( ) uses two nested for-loops: the outer loop starts by initializing a subset by including the highest-ranking peak (for sortpolicy=0 this is the newest peak), while the inner loop scans the rest of the peaks in the pool in decreasing rank order, adding a peak to the subset if it has a valid distance to the peak currently pointed to by the outer loop.

In alternative embodiments, the inner loop could be performed sequentially, but with the outer loop unrolled.

The peak pool has a maximum L peaks. Assuming that there are m L peaks in the pool, then the theoretical maximum number of subsets of peaks to evaluate (including the empty set) is $2^m$. The outer loop of the greedy peak ranking strategy taken in findBestSubset( ) has a span of m−maxNumPeaks+1. The inner loop span is maxNumPeaks−1.

Thus the total number of subsets constructed is (m−maxNumPeaks+1)(maxNumPeaks−1)

and the pruning ratio r is $r=2^{-m}$(m−maxNumPeaks+1)(maxNumPeaks−1).

Figure 7:
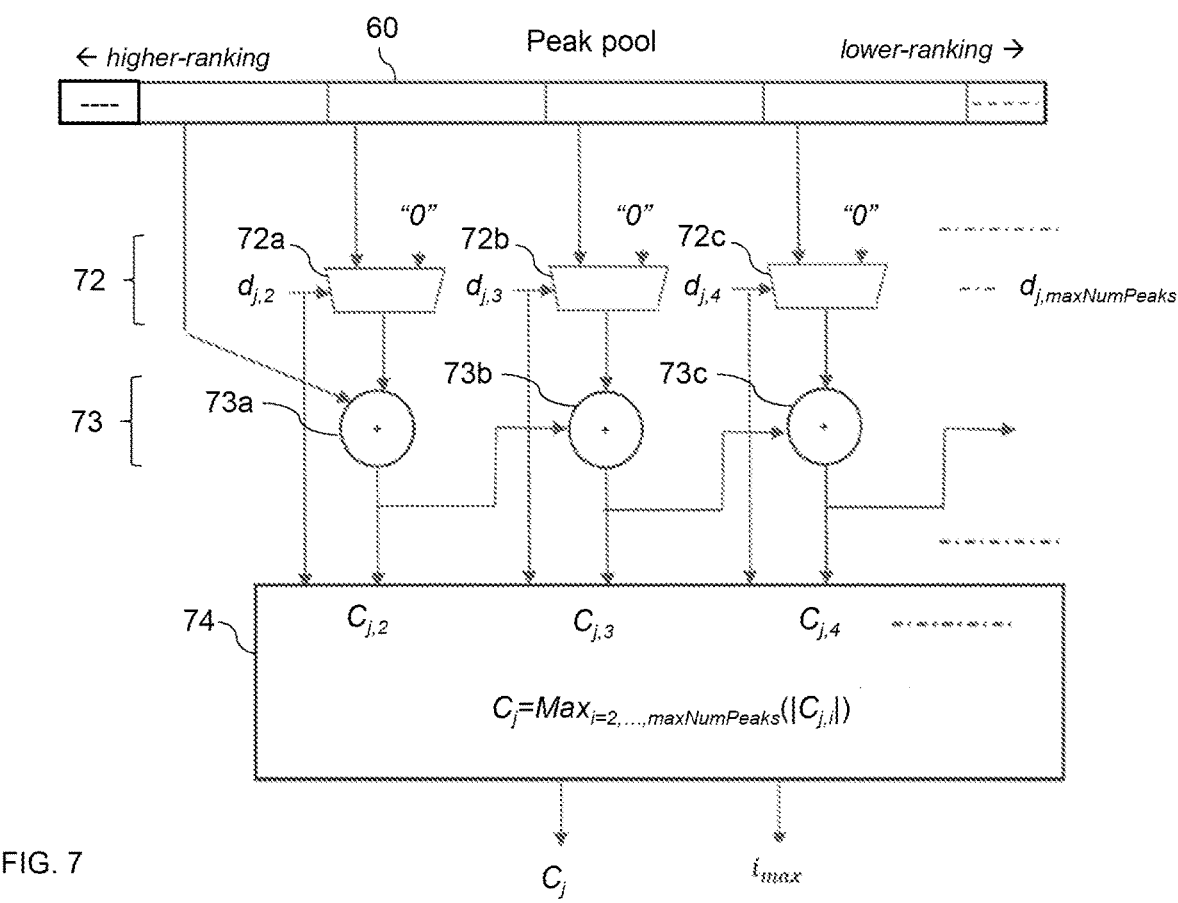
FIG. 7 is schematic diagram of a first part of the synchronization logic.
Figure 8:
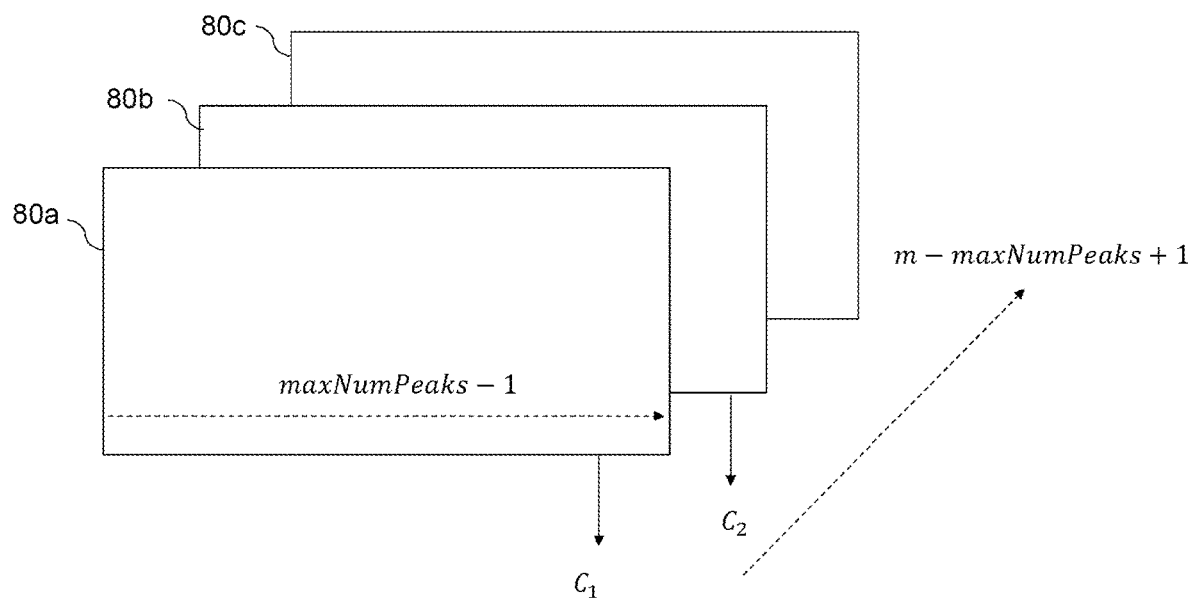
FIG. 8 is schematic diagram of a second part of the synchronization logic.

FIGS. 7 and 8 show possible compute structures for performing the inner and outer loops, respectively, of findBestSubset( ) assuming that the pool array 60 is ordered according to the sort policy.

FIG. 7 shows logic for performing a $j^{th}$ instance of the inner loop. A candidate group of peaks, sorted according to the sort policy, from the peak pool 60, is input to a set of multiplexers 72. The number of multiplexers 72 is one less than the parameter maxNumPeaks (e.g. four multiplexers 72 when maxNumPeaks=5). The members of the group can be drawn from any of the L vectors in the pool 60. When implemented in hardware, there may therefore be a layer of maxNumPeaks further multiplexers (not shown in FIG. 7) between the pool 60 and the set of multiplexers 72 and the first adder 73a, each additional multiplexer having L inputs for the L columns of the pool 60, and outputting to a respective one of the set of multiplexers 72 or the first adder 73a. In this way, any group of peaks from the sorted pool can be processed through the inner loop.

Each multiplexer 72a, 72b, 72c, . . . either passes the complex correlation value of a respective peak vector, received from the pool 60, or outputs zero, depending on a respective input decision variable $d_{j,i}$ for i=(j+1), . . . , (j+maxNumPeaks−1). Each $d_{j,i}$ equals 1 if the distance between the newest peak (peak "1") and peak i is valid—i.e. equals an integer multiple of the symbol period+/−the allowed jitter—and equals 0 otherwise. The multiplexers 72 output to a corresponding set of adders 73. The adders 73 add two complex-valued inputs and output their complexvalued sum. Each adder 73a, 73b, 73c, . . . receiving the output of a respective one of the multiplexers 72a, 72b, 72c, . . . . The first adder 73a also receives the correlation value of the highest-ranked (e.g. newest) vector of the current group, while each of the subsequent adders 73b, 73c also receives the output of the preceding adder 73a, 73b.

In this way, the adders 73 progressively sum the correlation values of the valid-spaced peaks of the group, horizontally from left to right. At each time step, each adder 73 outputs a respective partial sum, $C_{j,i}$, to a comparison block 74. The comparison block 74 identifies the partial sum, $C_{j,i}$, having the largest absolute value, and outputs this (as "$C_j$"), along with its index ("$i_{max}$"). Thus the outputs of the $j^{th}$ inner loop are: $C_j$, which is a coherently-accumulated Cn value; and $i_{max}$, which is an index corresponding to the vector of accumulated Cn values having maximum magnitude.

FIG. 8 depicts multiple layers 80a, 80b, 80c, . . . of the outer loop of findBestSubset( ). Each layer corresponds to a respective execution of the inner loop as shown in FIG. 7, but over a different group of peaks from the pool 60 (i.e. with a different highest-ranked member of the group each time). The layers 80 may be executed sequentially in time in some embodiments, using a single hardware or software implementation of the inner loop. In other embodiments, some or all of the layers 80 could be executed in parallel (i.e. with the outer loop unrolled). In hardware, there may be multiple inner-loop electrical circuits, e.g. implemented as L−maxNumPeaks+1 identical modules.

For L=12 and maxNumPeaks=5, there would be eight layers, each layer computing four complex vectors and finding the vector with maximum magnitude. This could be implemented in hardware using eight circuits similar to what is shown in FIG. 7. The computation within a layer may be implemented serially in some embodiments, needing four clock cycles, which may result in a smaller footprint.

Assuming, without loss of generality, there are m L peaks in the pool 60 at a certain point in time, the number of layers that need to be executed to search over the current pool 60 is equal to the number of outer loop iterations, which is m−maxNumPeaks+1. The decision variables provided to the inner loop for each layer j are $d_{j,i}$, for j=1, . . . , m−maxNumPeaks+1, and i=(j+1), . . . , (j+maxNumPeaks−1). The task performed by the algorithm is to identify the layer j with maximum $|C_j|$, j=1, . . . , m−maxNumPeaks+1.

If $j_{max}$ denotes the index of this layer, then the indices $i_{max}$, $j_{max}$, together with the decision variables $d_{j,i}$, determine the final identified subset of peak indexes as follows: $S_{best} = \{k | d_{j_{max}, j_{max}+1+k} > 0, 0 \leq k \leq i_{max}\}$. The logic 10 can also identify the corresponding vector of accumulated Cn values, $C_{j_{max}}$.

The timestamps of the peaks in the identified subset can then be used to determine the symbol timing, which can be passed to the detector 31, to be used for accurately decoding the rest of the packet. Also, the phases of one or more of the peaks in the identified subset can then be processed to determine a frequency offset, e.g. calculated from $C_{j_{max}}$, which can be passed to the CORDIC unit 34 to adjust the receiver so as to more accurately receive and decode the rest of the packet. By performing the search algorithm again, every time a new preamble peak is detected, it is possible that multiple estimates of frequency offset and/or symbol timing may be generated as the synchronization preamble is received. This enables an initial estimate of frequency offset and/or symbol timing to be obtained early, and used by the receiver straightaway, and then updated and improved as more of the preamble is received.

Not shown in the pseudo-code is a timeout mechanism, which the logic 10 implements. This simply blocks for framesync if the elapsed time since the last synchronization event exceeds a set limit. In the simulations below, this timeout limit was set at 10 symbol periods, i.e. 160 μs.

The "likely SFD seen" mechanism in the pseudo-code, is to mitigate an undesired behaviour that may arise sporadically due to incorrectly syncing on the two SFD symbols, especially when experiencing high signal-to-noise ratio (SNR) conditions. The problem can be reduced at higher SNR by setting a 'likelySFDseen' flag if the interpeak distance indicates the last arrival peak being the first SFD symbol (see reqnumzerosymbefSFD within findBestSubset( ) in the pseudocode). This allows syncing on the first SFD symbol in combination with reqnumzerosymbefSFD−1 preamble symbols. If the flag 'likelySFDseen' is set, further sync is blocked for some time (e.g. 2 symbol periods in the simulations below), by using a counter. The flag 'likelySFDseen' is set if such a peak constellation is seen by findBestSubset( ); however, it doesn't guarantee that the best subset of peaks found actually was this peak constellation. To indicate just that, a similar flag 'likelySFDsync' is used. This flag may be used by a subsequent symbol-timing average calculation.

This mechanism is straightforwardly implemented by adding one more layer to FIG. 8, which uses a separate set of decision variables in which $d_{1,i}$, i=2, . . . , maxNumPeaks, equals 1 if the distance between the newest peak and peak i is a multiple of (128 samples−16 samples+/−JTOL), assuming an oversampling factor of four. The reason for subtracting 16 samples is that the nominal distance between the last preamble symbol and the first SFD symbol will be 112 samples in such embodiments.

In some situations, setting minNumPeaks=3 (instead of 2) and/or JTOL=1 (instead of 2) may be beneficial in reducing the occurrence of undesired scenarios. In particular, it may help in a situation where findBestSubset( ) would otherwise sync onto something that looks like the first SFD symbol and something noisy that is spaced before the first SFD symbol by the valid distance (n*128+/−jitter). This happens when the outer loop can't loop past these two peaks because there aren't enough peaks, e.g. Mncnt is too small (≤6 when minNumPeaks=5), and so these two peaks would otherwise cause incorrect sync leading to the packet being lost.

Simulation Results

Simulations were carried out in MATLAB of an implementation of 802.15.4 PHY synchronization using the approaches disclosed herein. Its performance was analysed under different conditions. It was also compared to two naïve approaches.

The simulations used L≤12. This allows the pool to contain some spurious peaks in addition to eight genuine preamble peaks. The pool array was only updated whenever a new peak arrived. In the simulations, a minimum distance between peaks of 1 μs was enforced. Any new peak arriving within this window was ignored.

Unless otherwise stated, the following simulation settings were used:
1. L=12
2. minNumPeaks=2, maxNumPeaks=5
3. gamma=0
4. the "blocker" is a continuously modulated 802.15.4 OQPSK 250 Kbps signal with random bits at 0 Hz offset. When the blocker is applied, the wanted signal level is at −85 dBm
5. the number of packets simulated per point was 5,000

A figure-of-merit (FOM) was defined as the sensitivity vs selectivity. This is useful since the sensitivity and selectivity are competing performance figures: better algorithms should push the "isobars" towards the origin.

Setting gamma to 0.0 avoids complexity of scaling and look-up table usage when calculating "val=abs(cvec)/(|S|^gamma)" from the pseudo-code above, and still yielded good performance.

Figure 9:
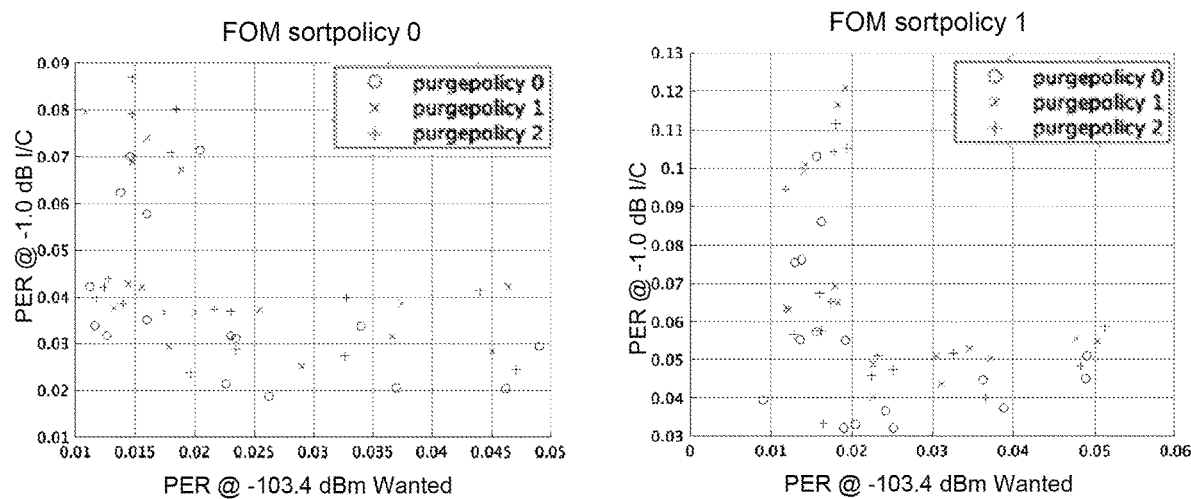
FIG. 9 is a pair of plots of a figure of merit, comparing simulated performance of an embodiment under two different sorting polices.

FIG. 9 shows FOM plots under the different sorting policies of visiting peaks newest to oldest (left plot) and visiting peaks in the order of decreasing |Cn| (right plot). Both plots consider the effect of each of the three different purge policies. The different FOM measurements were obtained by sweeping some of the parameters: corrTh (which corresponds to "Threshold" in the pseudocode above) was swept from 0.34 to 0.37; minNumPeaks was swept from 2 to 3; and maxNumPeaks was swept from 4 to 6. Other settings were JTOL=1, gamma=0.0, L=12.

It can be seen that values other than zero for sortpolicy and purgepolicy didn't appear to give a clear advantage, suggesting that these can reasonably be kept at zero at least in some embodiments. The best selectivity was obtained for minNumPeaks=3. However, this comes at a small cost in sensitivity, of approx. 0.2 dB as can be seen from FIGS. 10-12, in which the parameter corrTh is swept over three values: 0.35, 0.36 & 0.37.

Figure 10:
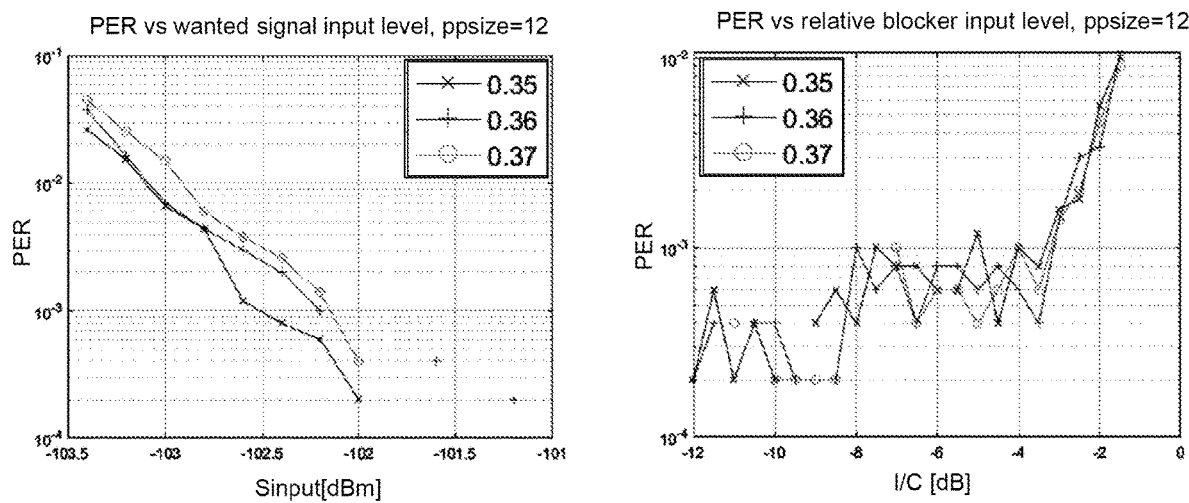
FIGS. 10, 11, 12, 13 & 14 provide respective pairs of plots of simulated packet error rate (PER) against absolute and relative signal input strength, for embodiment using different sets of parameters.
Figure 11:
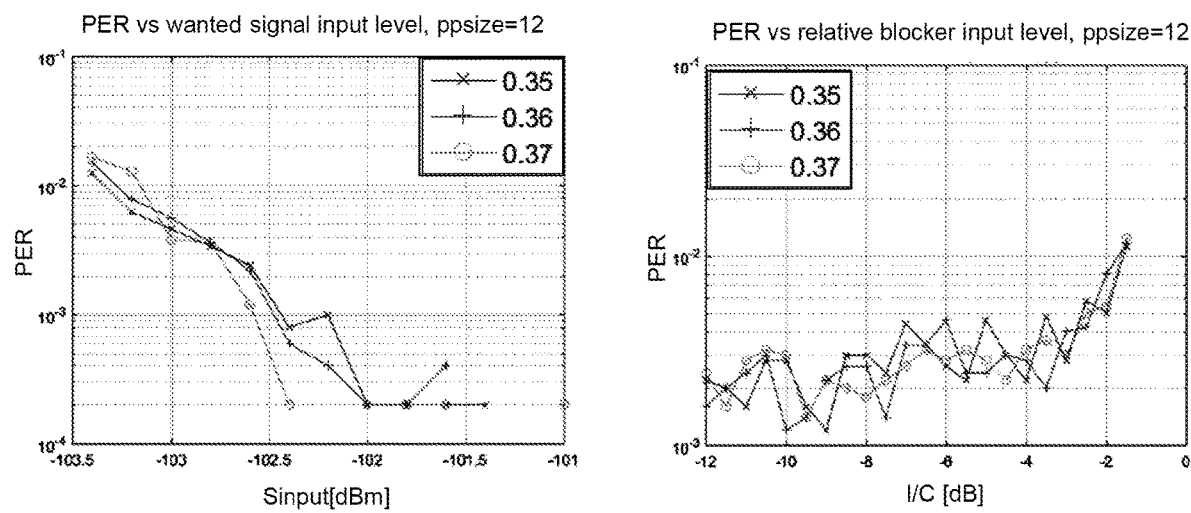
Figure 12:
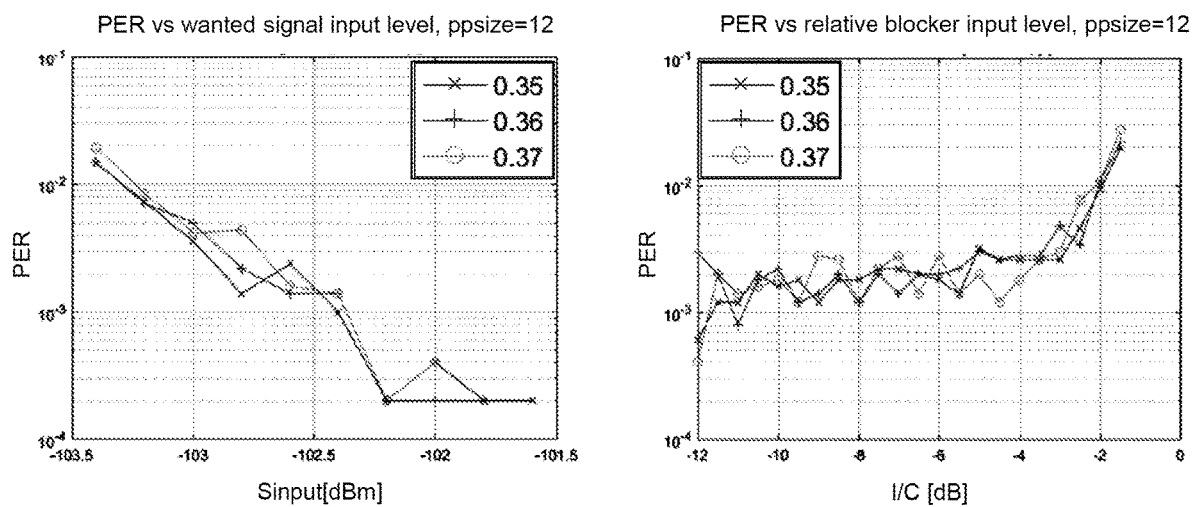

FIGS. 10, 11 & 12 show respective pairs of plots of PER against wanted signal input level (left plots), and of PER against a relative blocker input level (right plots), for the three different corrTh values. Other parameters were JTOL=1, gamma=0.0, L=12, purgepolicy=0, maxNumPeaks=5.

FIG. 10 used minNumPeaks=3 & sortpolicy=0. FIG. 11 used minNumPeaks=2 & sortpolicy=0. FIG. 12 used minNumPeaks=2 & sortpolicy=1.

By inspection of FIGS. 10-12, it appears that the best selectivity is obtained for minNumPeaks=3, while the best sensitivity was obtained for minNumPeaks=2. It appears that sortpolicy=purgepolicy=0, minNumpeaks=3, and gamma=0.0 works well, giving approx. −103.1 dBm sensitivity and very good selectivity (cochannel C/I ~1.5 dB) (see FIG. 10). Somewhat better sensitivity (approx. −103.3 dBm) was achieved with minNumpeaks=2 at the expense of a higher PER floor in the selectivity case (see FIG. 11). When sortpolicy=1, selectivity was reduced (cochannel C/I ~2 dB) without any improvement in sensitivity (see FIG. 12).

Figure 13:
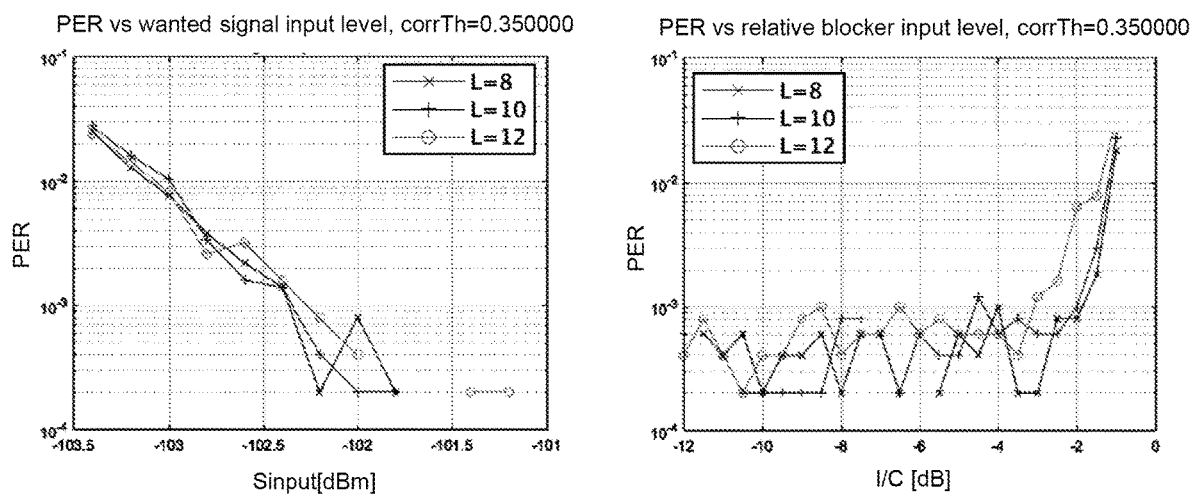

Sweeping L reveals that the selectivity can be improved further. FIG. 13 shows a PER sweep, with JTOL=1, gamma=0.0, corrTh=0.35, sortpolicy=purgepolicy=0, minNumPeaks=3, maxNumPeaks=5. From FIG. 13, it appears that for L=8 and minNumPeaks=3, a cochannel C/I ~1 dB can be obtained, while maintaining sensitivity at −103.1 dBm.

Figure 14:
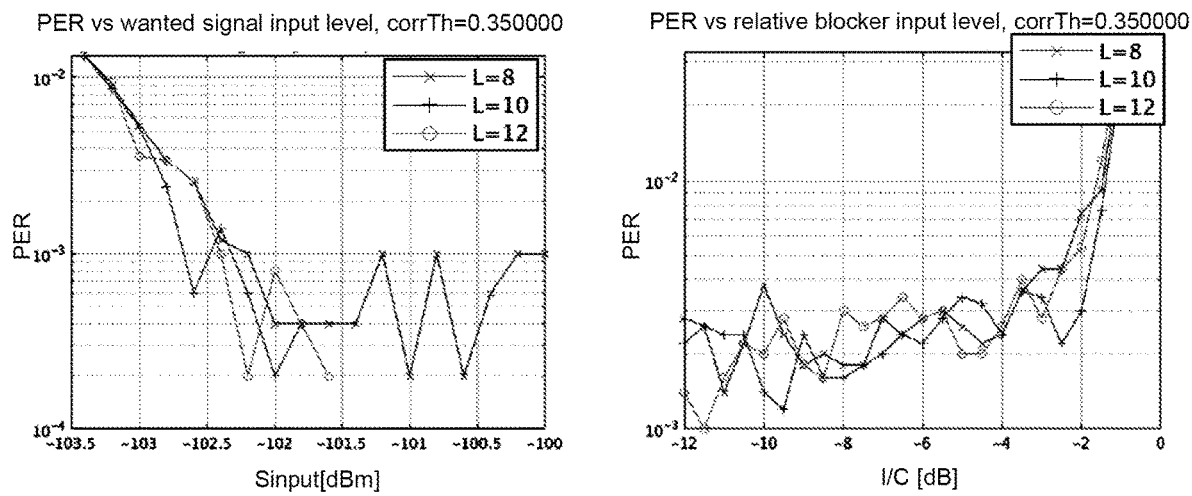

FIG. 14 shows a PER sweep, with JTOL=1, gamma=0.0, corrTh=0.35, sortpolicy=purgepolicy=0, minNumPeaks=2, maxNumPeaks=5. From FIG. 14, it appears that for L=10 and minNumPeaks=2, a cochannel C/I ~1.5 dB can be obtained with a sensitivity of −103.25 dBm.

Figure 15:
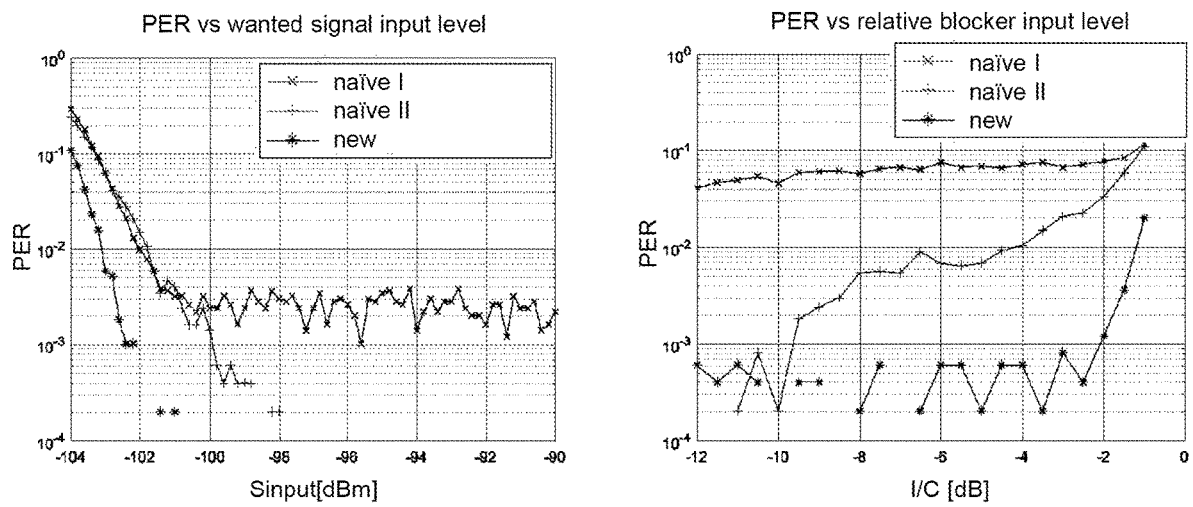
FIG. 15 is a pair of plots of simulated PER against absolute and relative signal input strength, comparing two naïve approaches with an embodiment.

In FIG. 15, three algorithms are simulated:
"naïve I": a first naïve approach that stops as soon as three qualifying peaks are identified;
"naïve II": a second naïve approach in which the preamble correlator and peak processing are allowed to run continuously up to SFD match (i.e. until framesync); and
"new": an implementation as described above.

For each, a PER sweep was performed, with L=10, JTOL=1, gamma=0.0, corrTh=0.35, sortpolicy=purgepolicy=0, minNumPeaks=3, maxNumPeaks=5. It can be seen from FIG. 15 that the PER of the new approach is almost always lower than that of each of the two naïve approaches.

Based on the simulation results, it may thus be desirable, at least in some embodiments, to increase minNumPeaks from 2 to 3 at higher signal levels to optimize selectivity. Also, a buffer size of L=8 or 10 and with corrTh=0.35 may also be advantageous.

Some embodiments may therefore not support values other than sortpolicy=purgepolicy=0, which may benefit implementation and performance by avoiding the need for any sorting. With purgepolicy=0 the implementation can be simplified by simply overwriting the oldest slot in the peak pool 60 when the pool 60 becomes full and a new peak arrives. This may save power as the logic 10 will only need to enable the clock to one column (out of the L columns) in the bit array in FIG. 6 whenever a new peak arrives.

Some embodiments may only support gamma=0.0, thereby avoiding the scaling and look-up table usage associated with a non-zero value.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A radio apparatus comprising a radio receiver for receiving a radio-frequency signal as a radio signal, wherein the radio receiver is configured to generate signal data from the received radio signal, wherein the radio apparatus is configured to:
   correlate the signal data with stored synchronization data to determine correlation data, wherein the signal data represents a received radio-frequency signal that encodes a data frame having a synchronization preamble comprising a plurality of instances of a predetermined synchronization sequence, and wherein the stored synchronization data represents the predetermined synchronization sequence;
   use a peak detection process to identify a set of peaks in the correlation data, each peak having an associated correlation value and an associated time value;
   use a timing criterion to identify a plurality of subsets of the set of identified peaks, each subset comprising a respective plurality of peaks, such that the time values of the peaks of each identified subset satisfy the timing criterion;
   calculate a respective correlation score for each of the identified subsets from the correlation values of the peaks of the respective subset by applying a coherent averaging process to the respective correlation values of each identified subset;
   compare the correlation scores to select a subset from the plurality of subsets having a highest correlation score;
   determine timing- or frequency-synchronization information for the radio apparatus from the peaks of the selected subset; and
   use the determined timing- or frequency-synchronization information when decoding the data frame.

2. The radio apparatus of claim 1, wherein the radio apparatus is configured to determine the synchronization information while the radio receiver is receiving the radio signal.

3. The radio apparatus of claim 1, configured to perform the steps of identifying a set of peaks, identifying a plurality of subsets, calculating correlation scores, selecting a subset, and determining synchronization information, a plurality of times, and configured to determine first synchronization information at a first time using a first portion of the correlation data, and to determine second synchronization information at a second time, after the first time, using a second portion of the correlation data, wherein the second portion includes some or all of the first portion and includes additional correlation data determined after the first portion was determined.

4. The radio apparatus of claim 1, configured to generate the correlation data over time and to detect peaks within the correlation data as the correlation data is generated, and further configured to determine updated synchronization information in response to detecting a new peak in the correlation data.

5. The radio apparatus of claim 1, configured to determine synchronization information by identifying a set of peaks from correlation data spanning the complete synchronization preamble.

6. The radio apparatus of claim 1, wherein the radio-frequency signal is a IEEE 802.15.4 or Bluetooth Low Energy signal and the radio apparatus is configured to decode IEEE 802.15.4 or Bluetooth Low Energy signals.

7. The radio apparatus of claim 1, configured to store data representing the identified set of peaks in a memory of the apparatus, wherein each peak is represented by a complex correlation value and a time value.

8. The radio apparatus of claim 7, wherein the set of peaks is bounded by a maximum number, and wherein the apparatus is configured to apply a purge process to remove one or more peaks from the set before adding a new peak when the set is full, wherein the purge process determines a peak to purge based on the time values of the peaks or the correlation values of the peaks.

9. The radio apparatus of claim 1, configured to sort the set of peaks based on the time values of the peaks or based on the correlation values of the peaks.

10. The radio apparatus of claim 1, wherein the timing criterion for identifying a subset of peaks is satisfied when the time values of the peaks of a subset are separated from each other by integer multiples of the duration of the predetermined synchronization sequence, within a predetermined margin for jitter.

11. The radio apparatus of claim 1, wherein identifying the subsets of peaks additionally uses a quantity criterion, which is satisfied only when a subset contains at least a predetermined minimum number of peaks.

12. The radio apparatus of claim 1, wherein identifying the plurality of subsets comprises determining, for each of a plurality of peaks in the set, whether a subset of peaks exists for which the respective peak is a highest-ranked peak in the subset under a sort policy, and wherein the subset satisfies the timing criterion.

13. A method of synchronizing a radio apparatus comprising a radio receiver for receiving the radio-frequency signal as a radio signal, wherein the radio receiver is configured to generate the signal data from the received radio signal, the method comprising:
   correlating signal data with stored synchronization data to determine correlation data, wherein the signal data represents a received radio-frequency signal that encodes a data frame having a synchronization preamble comprising a plurality of instances of a predetermined synchronization sequence, and wherein the stored synchronization data represents the predetermined synchronization sequence;

using a peak detection process to identify a set of peaks in the correlation data, each peak having an associated correlation value and an associated time value;

using a timing criterion to identify a plurality of subsets of the set of identified peaks, each subset comprising a respective plurality of peaks, such that the time values of the peaks of each identified subset satisfy the timing criterion;

calculating a respective correlation score for each of the identified subsets from the correlation values of the peaks of the respective subset by applying a coherent averaging process to the respective correlation values of each identified subset;

using the correlation scores to select a subset from the plurality of subsets having the highest correlation score;

determining timing- or frequency-synchronization information for the radio apparatus from the peaks of the selected subset; and using the determined timing- or frequency-synchronization information when decoding the data frame.

14. The method of claim 13, comprising determining the synchronization information while receiving the radio-frequency signal.

15. The method of claim 13, comprising performing the steps of identifying a set of peaks, identifying a plurality of subsets, calculating correlation scores, selecting a subset, and determining synchronization information, a plurality of times, and determining first synchronization information at a first time using a first portion of the correlation data, and determining second synchronization information at a second time, after the first time, using a second portion of the correlation data, wherein the second portion includes some or all of the first portion and includes additional correlation data determined after the first portion was determined.

16. The method of claim 13, configured to determine synchronization information by identifying a set of peaks from correlation data spanning the complete synchronization preamble.

17. The method of claim 13, wherein the radio-frequency signal is a IEEE 802.15.4 or Bluetooth Low Energy signal.

18. The method of claim 13, comprising sorting the set of peaks based on the time values of the peaks or based on the correlation values of the peaks.

19. The method of claim 13, wherein the timing criterion for identifying a subset of peaks is satisfied when the time values of the peaks of a subset are separated from each other by integer multiples of the duration of the predetermined synchronization sequence, within a predetermined margin for jitter.

20. The method of claim 13, wherein identifying the plurality of subsets comprises determining, for each of a plurality of peaks in the set, whether a subset of peaks exists for which the respective peak is a highest-ranked peak in the subset under a sort policy, and wherein the subset satisfies the timing criterion.

21. The radio apparatus of claim 1, wherein the radio apparatus is configured to calculate the respective correlation score for each of the identified subsets as a magnitude of a sum of the correlation values of the peaks of the identified subset.

22. The method of claim 13, comprising calculating the respective correlation score for each of the identified subsets as a magnitude of a sum of the correlation values of the peaks of the identified subset.

* * * * *